(12) United States Patent
Gaertig et al.

(10) Patent No.: US 11,925,887 B2
(45) Date of Patent: Mar. 12, 2024

(54) SEPARATION TANK DEVICE

(71) Applicants: Ashley Gaertig, Temecula, CA (US);
Eric Gaertig, Temecula, CA (US)

(72) Inventors: Ashley Gaertig, Temecula, CA (US);
Eric Gaertig, Temecula, CA (US)

( * ) Notice: Subject to any disclaimer, the term of this patent is extended or adjusted under 35 U.S.C. 154(b) by 296 days.

(21) Appl. No.: 17/220,384

(22) Filed: Apr. 1, 2021

(65) Prior Publication Data
US 2022/0314146 A1    Oct. 6, 2022

(51) Int. Cl.
| | | |
|---|---|---|
| *B01D 33/03* | (2006.01) | |
| *B01D 33/42* | (2006.01) | |
| *B07B 1/28* | (2006.01) | |
| *B07B 1/46* | (2006.01) | |

(52) U.S. Cl.
CPC .......... *B01D 33/0376* (2013.01); *B01D 33/42* (2013.01); *B07B 1/284* (2013.01); *B07B 1/4618* (2013.01)

(58) Field of Classification Search
CPC ............ B01D 29/27; B01D 2201/4023; B01D 2201/4084; B01D 2201/33; B01D 2201/0376; B01D 2201/42; B07B 1/284; B07B 1/4618
See application file for complete search history.

(56) References Cited

U.S. PATENT DOCUMENTS

| | | | | |
|---|---|---|---|---|
| 8,485,364 | B2 * | 7/2013 | Krush | ........................ B07B 1/38 209/326 |
| 9,718,801 | B2 | 8/2017 | Love | |
| 10,646,881 | B1 | 5/2020 | Page | |
| 2007/0084762 | A1 * | 4/2007 | Mainwaring | ............. B07B 1/48 209/405 |
| 2017/0001200 | A1 | 1/2017 | Leffel | |
| 2017/0320095 | A1 * | 11/2017 | Lunnemann | .......... B07B 1/4618 |
| 2020/0030397 | A1 | 1/2020 | Himes et al. | |
| 2021/0252087 | A1 * | 8/2021 | Laughton | ............... B01D 29/27 |

OTHER PUBLICATIONS

Website available at least as early as Mar. 8, 2021 at:https://www.aliexpress.com/i/33012561935.html.
Website available at least as early as Mar. 8, 2021 at: http://m.mixerbeadmill.com/liquid-filtration-equipment/vibrating-sieve-filter.html.
Website available at least as early as Mar. 8, 2021 at: https://www.kason.com/products-and-solutions/sifting-and-screening/vibroscreen-circular-vibratory-screeners-and-separators/typical-configurations/cannabis-sorter/.
Website available at least as early as Mar. 8, 2021 at: https://www.tecscrn.com/wp-content/uploads/2019/04/TecScrn-Industries-InfoSheet-Cannabis.pdf.

* cited by examiner

*Primary Examiner* — Michael McCullough
*Assistant Examiner* — Kalyanavenkateshware Kumar
(74) *Attorney, Agent, or Firm* — PATENTFILE, LLC; Bradley C. Fach; Steven R. Kick

(57) ABSTRACT

A separation tank device may include a holding tank having a tank wall coupled to and extending above a tank base. A base wall may be coupled to and may extend above the tank base. The base wall may form a base upper aperture that is opposingly positioned to the tank base, and a base lower aperture may be formed in the base wall. The device may further include a movable wall having a movable upper aperture and a movable lower aperture, and the movable wall may be movable between a first position and a second position. When the movable wall is in the first position, the movable lower aperture may be positioned above and aligned with the base upper aperture, and when the movable wall is in the second position the movable lower aperture may be unaligned with the base upper aperture.

18 Claims, 9 Drawing Sheets

SEPARATION TANK DEVICE

FIELD OF THE INVENTION

This patent specification relates to the field of devices which may be used for separation of liquid and solid materials. More specifically, this patent specification relates to devices which may be used for mechanical separation of liquid and solid materials.

BACKGROUND

In foodstuff and consumable materials industry, it is common to perform one or more processes for separating mixtures of liquid and solid materials. While devices and apparatuses exist for this purpose, they suffer from one or more drawbacks. For example, some separation devices require a plurality of separation containers or other components to be assembled and stacked in series which is time and labor intensive. As another example, other separation devices are not reconfigurable and are limited in the size of the solid materials that they are able to separate which results in an expenditure requirement to have and maintain a number of different devices.

Therefore, a need exists for novel devices which may be used in separation processes, such as for separation of liquid and solid materials. A further need exists for novel separation devices which do not require the assembly and disassembly of a large number of components. There is also a need for novel separation devices which are reconfigurable and able to separate a wide size range of solid materials from liquid materials.

BRIEF SUMMARY OF THE INVENTION

A separation tank device is provided which may be used for the separation of liquid and solid materials. In some embodiments, the separation tank device may include a holding tank having a tank wall coupled to and extending above a tank base. A base wall may be coupled to and may extend above the tank base. The base wall may form a base upper aperture that is opposingly positioned to the tank base, and a base lower aperture may be formed in the base wall. The device may further include a movable wall having a movable upper aperture and a movable lower aperture, and the movable wall may be movable between a first position and a second position. When the movable wall is in the first position, the movable lower aperture may be positioned above and aligned with the base upper aperture, and when the movable wall is in the second position the movable lower aperture may be unaligned with the base upper aperture.

In further embodiments, the device may include one or more filter bags having a bag wall, a bag upper aperture, and a bag base which may form a bag cavity. At least one filter bag may be received in a movable wall by having each bag wall placed in contact with or in close proximity to the movable interior surface, by having each bag upper aperture placed around or within the movable upper perimeter, and by having each bag base placed in or proximate to the movable lower aperture. In this manner, the one or more filter bags may be positioned so that in order for material to pass through the movable cavity and to exit the movable lower aperture, the material must first pass through the filter bag(s) and respective bag cavity(ies). Similarly, at least one filter bag may be received in a base wall by having each bag wall placed in contact with or in close proximity to the base interior surface, by having each bag upper aperture placed around or within the base upper perimeter, and by having each bag base placed in or proximate to the base lower aperture. In this manner, the one or more filter bags may be positioned so that in order for material to pass through the base cavity and to exit the base lower aperture, the material must first pass through the filter bags and respective bag cavity(ies).

In further embodiments, the device may include a support pillar that may be coupled to the movable wall and coupled to at least one of the holding tank and the base wall. Preferably, a movable coupling may be coupled to the support pillar, and the movable coupling may enable the movable wall to be movable between the first position and the second position.

In still further embodiments, the device may include a vibration motor which may be configured to vibrate one or more of the base wall, the movable wall, and the tank base.

In still further embodiments, the device may include a tank drain which may allow materials to exit the holding tank.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
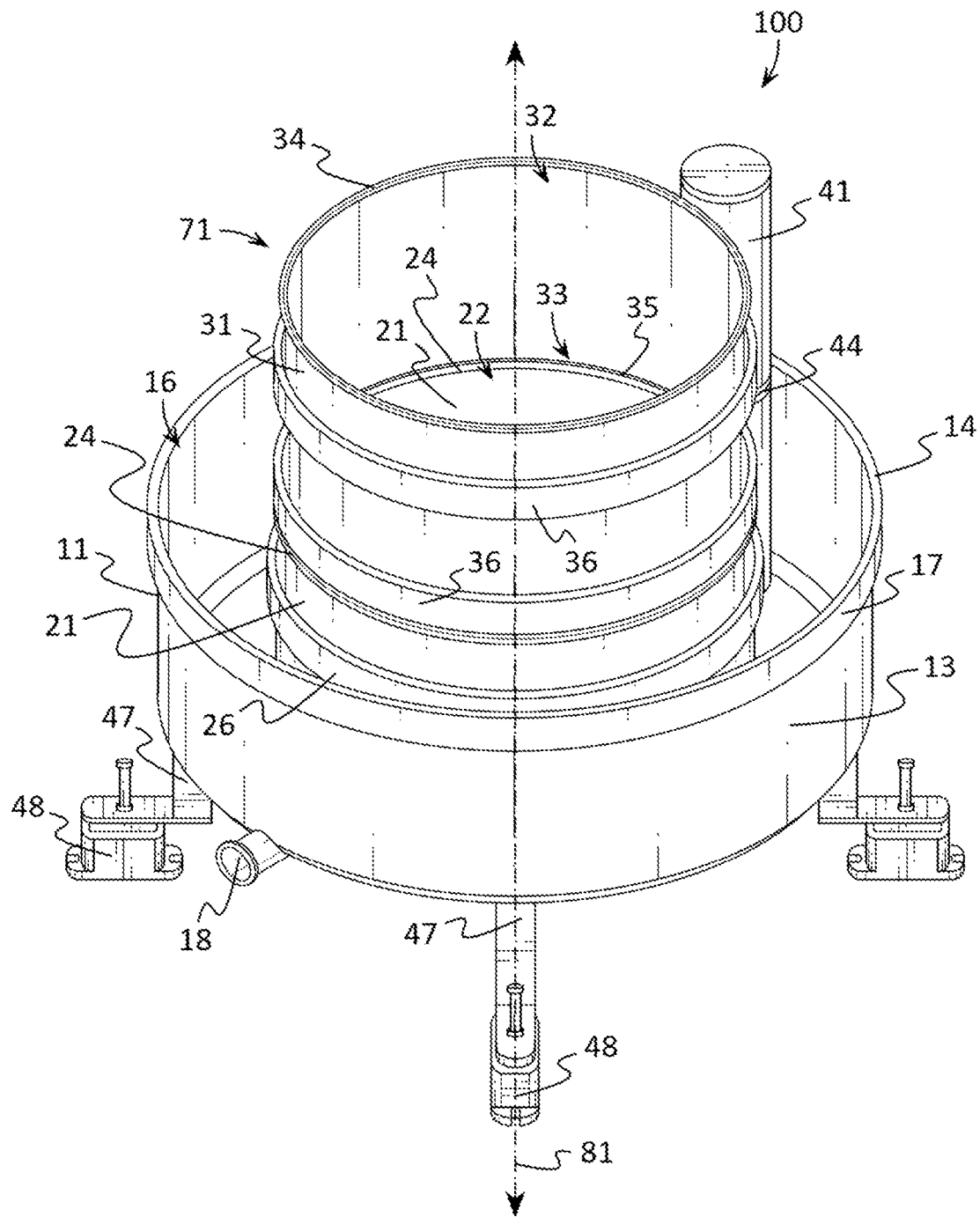
FIG. 1 depicts a perspective view of an example of a separation tank device in a first position according to various embodiments described herein.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new separation tank device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1-6 illustrate an example of a separation tank device ("the device") 100 according to various embodiments. In some embodiments, the device 100 may comprise a holding tank 11 which may have a tank wall 13 coupled to and extending above a tank base 12. A base wall 21 may be coupled to and may extend above the tank base 12, and the base wall 21 may form a base upper aperture 22 that is opposingly positioned to the tank base 12. A base lower aperture 23 may be formed in the base wall 21. A movable wall 31, movable between a first position 71 and a second position 72, may comprise a movable upper aperture 32 and a movable lower aperture 33. The movable lower aperture 33 may be positioned above and aligned with the base aperture upper 22 when the movable wall 31 is in the first position 71, and the movable lower aperture 33 may be unaligned with the base upper aperture 22 when the movable wall 31 is in the second position 72.

The device 100 may comprise a holding tank 11 which may be configured in any shape and size and which may include a tank wall 13 coupled to and extending above a tank base 12 to form a tank cavity 19. The tank base 12 and tank wall 13 may be configured in any shape and size so as to form a tank cavity 19 in any shape and size. The tank wall 13 may comprise a tank exterior surface 13A and a tank interior surface 13B. Preferably, a tank wall 13 may extend away from the tank base 12 in an approximately perpendicular manner. In preferred embodiments, a tank base 12 may be generally planar in shape and a tank wall 13 may be generally cylindrical in shape so as to form a generally cylindrical shaped holding tank 11. In further embodiments, a tank base 12 and tank wall 13 may be shaped to form a cuboid shaped holding tank 11, triangular prism shaped holding tank 11, or any other shaped holding tank 11, including combinations of shapes.

In preferred embodiments, the tank upper perimeter 14, and therefore the tank upper aperture 16 may be generally circular in shape, while in other embodiments, the tank upper perimeter 14, and therefore the tank upper aperture 16, may be generally rectangular shaped, square shaped, triangular shaped, hexagonal shaped, or configured in any other shape, including combinations of shapes.

The tank wall 13 may comprise a tank upper perimeter 14 and a tank lower perimeter 15. The tank upper perimeter 14 may form a tank upper aperture 16. In some embodiments, the tank wall 13 and its tank upper perimeter 14 may be sized and shaped to allow the base wall 21 to fit inside the tank wall 13 so that the base wall 21 may rest on and be coupled to the tank base 12. Preferably, a tank upper aperture 16 may be larger in size than each of the: base upper aperture 22; base lower aperture 23; movable upper aperture 32; and movable lower aperture 33. In further embodiments, the tank wall 13 and its tank upper perimeter 14 may be sized and shaped to allow the base wall 21 and a support pillar 41 to fit inside the tank wall 13 so that the base wall 21 and support pillar 41 may rest on and be coupled to the tank base 12.

A holding tank 11 may be made from or may comprise any material suitable for contacting foodstuff, such as food-grade stainless steel, copper, aluminum, nickel, nylon, polyurethane, vinyl, Bisphenol A free polycarbonate (BPA-free polycarbonate), High-density polyethylene (HDPE), other types of polyethylene, polyvinyl chloride, rubber, silicone, Pyrex glass, or any other suitable food-grade material.

Optionally, the device 100 may comprise one or more tank reinforcement rings 17 which may be coupled anywhere on a tank wall 13 and/or tank base 12 and which may be configured to structurally reinforce the tank wall 13 and/or tank base 12. Preferably, a tank reinforcement ring 17 may comprise a ring or other shaped unit of material, such as which may be used to form the holding tank 11, which may be coupled to, such as by being welded, integrally formed together, etc., a portion of the tank wall 13 and/or tank base 12.

Preferably, the tank lower perimeter 15 may be coupled to the tank base 12 in a water-tight manner to allow the holding tank 11 to hold or contain a volume of liquid. In preferred embodiments, the device 100 may comprise a tank drain 18 which may govern the ability of the holding tank 11 to hold or contain a volume of liquid. Generally, a tank upper aperture 16 and tank drain 18 may be in fluid communication so that a liquid and other materials may pass through the interior of the tank wall 13 via the tank upper aperture 16 and tank drain 18. A tank drain 18 may be formed into or coupled to the tank base 12 and/or tank wall 13. A tank drain 18 may comprise an exit aperture 18A which may form the exit point of the tank drain 18 through which liquids and other materials may exit the holding tank 11. In preferred embodiments, an exit aperture 18A of a tank drain 18 may be positioned so that all or portions of the exit aperture 18A are lower than the tank base 12 to allow the tank drain 18 to completely drain liquid in the holding tank 11 via the action of gravity.

The device 100 may comprise a base wall 21 having a base upper perimeter 24 and a base lower perimeter 25. The base wall 21 may also comprise a base exterior surface 21A and a base interior surface 21B. In some embodiments, the device 100 may comprise a base wall 21 having a base lower perimeter 25 which may be coupled to the tank base 12 and the base wall 21 may extend above and away from the tank base 12 to form a base cavity 27. In other embodiments, the device 100 may comprise a base wall 21 which may be coupled to a support pillar 41 so that the base lower perimeter 25 may be supported above the tank base 12 without contacting the tank base 12 while allowing the base wall 21 to extend above and away from the tank base 12.

A base wall 21 and a base cavity 27 may be configured in any shape and size. In preferred embodiments, a base wall 21 may be generally cylindrical in shape and coupled to a generally planar shaped tank base 12 so as to form a generally cylindrical shaped container. In further embodiments, a tank base 12 and base wall 21 may be shaped to form a cuboid shaped container, triangular prism shaped container, or any other shaped container, including combinations of shapes. Preferably, a base wall 21 may extend away from the tank base 12 in an approximately perpendicular manner.

The base upper perimeter 24 may form a base upper aperture 22 that may be opposingly positioned to the tank base 12 and base lower perimeter 25. Optionally, the base upper perimeter 24 may be approximately equal in height to the tank upper perimeter 14. Preferably, the base upper perimeter 24 may be greater in height than the tank upper perimeter 14 so that the base upper perimeter 24 may extend above the tank upper perimeter 14.

In preferred embodiments, the base upper perimeter 24, and therefore the base upper aperture 22, may be generally circular in shape, while in other embodiments, the base upper perimeter 24 and therefore the base upper aperture 22 may be generally rectangular shaped, square shaped, triangular shaped, hexagonal shaped, or configured in any other shape, including combinations of shapes. In further embodiments, the shape of a base upper aperture 22 may be independent of the shape of the base upper perimeter 24.

The device 100 may comprise one or more base lower apertures 23 which may provide fluid communication between and/or through the base wall 21 and the holding tank 11 so that a liquid entering the base upper aperture 22 may flow into the holding tank 11 by passing through the one or more base lower apertures 23. Base lower apertures 23 may be configured in any size and shape. In preferred embodiments, a base lower aperture 23 may be cut or otherwise formed into the base wall 21 so that the base lower aperture 23 forms a gap in the base lower perimeter 25 while allowing other portion(s) of the base lower perimeter 25 to be coupled to the tank base 12. In other embodiments, a base wall 21 may be coupled to a support pillar 41 so that the base lower perimeter 25 may be supported above the tank base 12 without contacting the tank base 12 so that the base lower perimeter 25 forms a base lower aperture 23.

A base wall 21 may be made from or may comprise any material suitable for contacting foodstuff, such as which may be used to form all or portions of a holding tank 11. Optionally, the device 100 may comprise one or more base reinforcement rings 26 which may be coupled anywhere on a base wall 21 and which may be configured to structurally reinforce the base wall 21. Preferably, a base reinforcement ring 26 may comprise a ring or other shaped unit of material, such as which may be used to form the base wall 21, which may be coupled to, such as by being welded, integrally formed together, etc., a portion of the base wall 21.

The device 100 may comprise a movable wall 31 having a movable upper perimeter 34 and a movable lower perimeter 35. The movable wall 31 may also comprise a movable exterior surface 31A and a movable interior surface 31B. The movable interior surface 31B may form a movable cavity 37. In some embodiments, the device 100 may comprise a movable wall 31 which may be movably coupled to the tank base 12 and/or base wall 21 so that the movable wall may be movably supported above the base wall 21. In preferred embodiments, the device 100 may comprise a movable wall 31 which may be coupled to a support pillar 41 so that the movable wall 21 may be movably supported above the base wall 11 without contacting the holding tank 11.

A movable wall 31 and a movable cavity 37 may be configured in any shape and size. In preferred embodiments, a movable wall 31 may be generally cylindrical in shape. In further embodiments, a movable wall 31 may be cuboid shaped, triangular prism shaped, or configured in any other shaped, including combinations of shapes. Preferably, a movable wall 31 may be approximately parallel to a tank wall 13 and/or base wall 21 while being approximately perpendicular to the tank base 12.

The movable wall 31 may comprise a movable upper aperture 32 and a movable lower aperture 33 which may be opposingly positioned to each other. Generally, a movable upper aperture 32 and movable lower aperture 33 may be in fluid communication so that a liquid and other materials may pass through the interior of the movable wall 21 via the movable upper aperture 32 and movable lower aperture 33. In some embodiments, the movable upper perimeter 34 may form a movable upper aperture 32, and the movable lower perimeter 35 may form a movable lower aperture 33.

In preferred embodiments, the movable upper perimeter 34, and therefore the movable upper aperture 32, may be generally circular in shape, while in other embodiments, the movable upper perimeter 34 and therefore the movable upper aperture 32 may be generally rectangular shaped, square shaped, triangular shaped, hexagonal shaped, or configured in any other shape, including combinations of shapes. In further embodiments, the shape of a movable upper aperture 32 may be independent of the shape of the movable upper perimeter 34. Likewise, in further preferred embodiments, the movable lower perimeter 35, and therefore the movable lower aperture 33, may be generally circular in shape, while in other embodiments, the movable lower perimeter 35 and therefore the movable lower aperture 33 may be generally rectangular shaped, square shaped, triangular shaped, hexagonal shaped, or configured in any other shape, including combinations of shapes. In further embodiments, the shape of a movable lower aperture 33 may be independent of the shape of the movable lower perimeter 35.

A movable wall 31 may be made from or may comprise any material suitable for contacting foodstuff, such as which may be used to form all or portions of a holding tank 11. Optionally, the device 100 may comprise one or more movable reinforcement rings 36 which may be coupled anywhere on a movable wall 31 and which may be configured to structurally reinforce the movable wall 31. Preferably, a movable reinforcement ring 36 may comprise a ring or other shaped unit of material, such as which may be used to form the movable wall 31, which may be coupled to, such as by being welded, integrally formed together, etc., a portion of the movable wall 31.

In some embodiments, the device 100 may comprise a movable upper aperture 32 and a movable lower aperture 33 that may be approximately the same size. For example, a movable upper aperture 32 and a movable lower aperture 33 may each comprise a diameter (or other dimension which may be used to determine the area or size of the apertures 32, 33) of approximately 30 inches. In further embodiments, the device 100 may comprise a movable lower aperture 33 may be between approximately 85 to 120 percent of the size of the movable upper aperture 32. In preferred embodiments, the device 100 may comprise a movable lower aperture 33 may be between 85 to 100 percent of the size of the movable upper aperture 32.

In some embodiments, the device 100 may comprise a movable lower aperture 33 and a base upper aperture 22 that may be approximately the same size. For example, a movable lower aperture 33 and a base upper aperture 22 may each comprise a diameter (or other dimension which may be used to determine the area or size of the apertures 33, 22) of approximately 30 inches. In further embodiments, the device 100 may comprise a movable lower aperture 33 may be between approximately 85 to 120 percent of the size of the base upper aperture 22. In preferred embodiments, the device 100 may comprise a movable lower aperture 33 may be between 85 to 100 percent of the size of the base upper aperture 22.

In further preferred embodiments, the device 100 may comprise a movable lower aperture 33 that may be between 85 to 100 percent of the size of a base upper aperture 22, and the movable lower aperture may be between 95 to 100 percent of the size of a movable upper aperture 32.

The device 100 may comprise one or more movable couplings 44 which may be configured to enable one or more movable walls 31 to be moved between a first position 71 and a second position 72. In some embodiments, a movable coupling 44 may comprise a hinged coupling such as butt hinge, butterfly hinge, flush hinge, barrel hinge, concealed hinge, continuous hinge, T-hinge, strap hinge, double-acting hinge, Soss hinge, a flexible material hinge, or any other hinge. In still further embodiments, a movable coupling 44 may comprise a pivotal or rotating coupling such as a rivet, bearing, such as a Delrin (Polyoxymethylene, also known as acetal, polyacetal, and polyformaldehyde, or other friction reducing material) donut plate, knuckle joint, universal joint, male ball joint and female socket joint, or any other pivotal or rotating coupling, or any other method of movably coupling two objects together so that one object may be moved, pivoted, rotated, or the like, relative to the other object.

In some embodiments, the device 100 may comprise a support pillar 41 which may be configured to support one or more movable walls 31 above a base wall 21 and holding tank 11 while allowing the one or more movable walls 31 to be moved between a first position 71 and a second position 72. Preferably, a movable coupling 44 may be coupled to the support pillar 41, and the movable coupling 44 may enable a movable wall 31 that is coupled to the support pillar 41 to be movable between the first position 71 and the second position 72. A support pillar 41 may be made from or may comprise any material, including a material that is suitable for contacting foodstuff, such as which may be used to form all or portions of a holding tank 11.

A movable wall 31 may be coupled to a support pillar 41 with any suitable coupling method. Optionally, one or more movable reinforcement rings 36 may be coupled to a support pillar 41 in order to couple a movable wall 31 to the support pillar 41. A support pillar 41 may be configured in any size and shape. In some embodiments, a support pillar 41 may comprise a generally cylindrical shape. In other embodiments, a support pillar 41 may comprise a generally rectangular prism shape or any other shape including combinations of shapes.

In preferred embodiments, a support pillar 41 may be coupled to the holding tank 11 and/or a base wall 21 that may be coupled to the holding tank 11. In further embodiments, a support pillar 41 may be coupled to a tank base 12, a tank wall 13, and/or a base wall 21. In further embodiments, support pillar 41 may be coupled to the interior of the holding tank 11 by being coupled to the holding tank 11 within the tank upper aperture 16. In other embodiments, a support pillar 41 may be coupled to the exterior of the holding tank 11 by being coupled to an exterior surface of the tank base 12, tank wall 13, and/or other element of the device 100.

In some embodiments, a support pillar 41 may comprise one or more sections, such as an upper section 42 and a lower section 43 which may be coupled together with a movable coupling 44 which may allow at least one section 42, 43, to be moved relative to another section 42, 43. For example, a movable coupling 44 may couple an upper section 42 to a lower section 43 with the lower section 43 also coupled to the holding tank 11 and/or base wall 21 so that the lower section 43 may be stationary while the upper section 42 may be moved or pivoted relative to the lower section 43, holding tank 11, and/or base wall 21. In preferred embodiments, a support pillar 41 may comprise an upper section 42 and a lower section 43 in which the lower section 43 may be coupled to the holding tank 11 and/or the base wall 21, and the upper section 42 may be movably coupled to the lower section 43 via a movable coupling 44.

In some embodiments, the device 100 may comprise a vibration motor 45 which may be configured to vibrate one or more of the base wall 21, movable wall 31, holding tank 11, and support pillar 41. Generally, a vibration motor 45 may be configured to vibrate, shake, or produce any other series of rapid and repeated movements. A vibration motor 45 may comprise a long life brushless (BLDC) vibration motor, a coin or pancake vibration motor, an encapsulated vibration motor, an enclosed vibration motor, a pager motor, an eccentric rotating mass (ERM) motor, a linear resonant actuator (LRA), or any other electrical, hydraulic, pneumatic, etc., device capable of producing a series of rapid and repeated movements.

A vibration motor 45 may be coupled to any element of the device 100. In preferred embodiments, a vibration motor 45 may be coupled to the holding tank 11, such as to or below the tank base 12. Optionally, a vibration motor 45 may be coupled to the tank base 12 via a motor mount 46 and one or more fasteners, such as bolts and nuts, screws, rivets, etc. A motor mount 46 may be made from any suitable material which may allow vibrations from a vibration motor 45 to be communicated through the motor mount 46 to a base wall 21, movable wall 31, holding tank 11, and/or support pillar 41. In preferred embodiments, a vibration motor 45 may be coupled to a motor mount 46 and/or tank base 12 so that the vibration motor 45 may be positioned centrally below the base upper aperture 22. In further preferred embodiments, a vibration motor 45 may be coupled to a motor mount 46 and/or tank base 12 so that the vibration motor 45 may be positioned centrally below the base upper aperture 22 and the upper 32 and lower 33 apertures of the movable wall 31 when the movable wall 31 is in the first position 71.

In further preferred embodiments, the device 100 may comprise a central vertical axis 81 which may extend perpendicular to a support surface 200 upon which the device 100 may be placed. A central vertical axis 81 may extend through the center of the device 100 by extending vertically through the base wall 21, such as centrally through the base apertures 22, 23, through the one or more movable walls 31, such as centrally through the movable apertures 32, 33 (when the movable wall 31 is in the first position 71), and optionally through a tank wall 13, such as centrally through the tank upper aperture 16. In preferred embodiments, a vibration motor 45 may be coupled to a motor mount 46 and/or tank base 12 so that the central vertical axis 81 may also extend through the vibration motor 45.

In some embodiments, the device 100 may comprise one or more support legs 47 which may be coupled to a motor mount 46 and/or tank base 12 and which may be configured to increase the separation distance between a vibration motor 45, holding tank 11, etc., and a support surface 200 upon which the device 100 may be placed. Support legs 47 may be configured in any shape and size. And support legs 47 may be made from any structural material, such as steel, aluminum, hard plastic, etc., which may be able to support the weight of the device 100 and any materials placed therein or thereon.

In some embodiments, the device 100 may comprise one or more isolation mounts 48 which may be coupled to one or more support legs 47 or other element of the device 100 and which may be configured to reduce vibration transmission between the device 100 and a surface 200 that is supporting the device 100. In preferred embodiments, an isolation mount 48 may comprise a spring, such as a steel coil spring, which may be coupled between a lower or ground contacting element and an upper element which may be coupled to a support leg 47 or other element of the device 100, and the spring may absorb or otherwise reduce vibration transmission between the upper and lower elements. In further embodiments, an isolation mount 48 may comprise a rubber, flexible polymer, or other resilient material which may be coupled to a support leg 47 or other element of the device 100, and the resilient material may absorb or otherwise reduce vibration transmission between the upper and lower elements. In still further embodiments, an isolation mount 48 may comprise any other type of active and/or passive type of vibration isolator device or method, such as air isolators, springs or spring dampers, elastomer or cork pads, molded or bonded elastomer mounts, negative-stiffness isolators, wire rope isolators, bungee cord isolators, base isolators, and tuned mass dampers.

Figure 2:
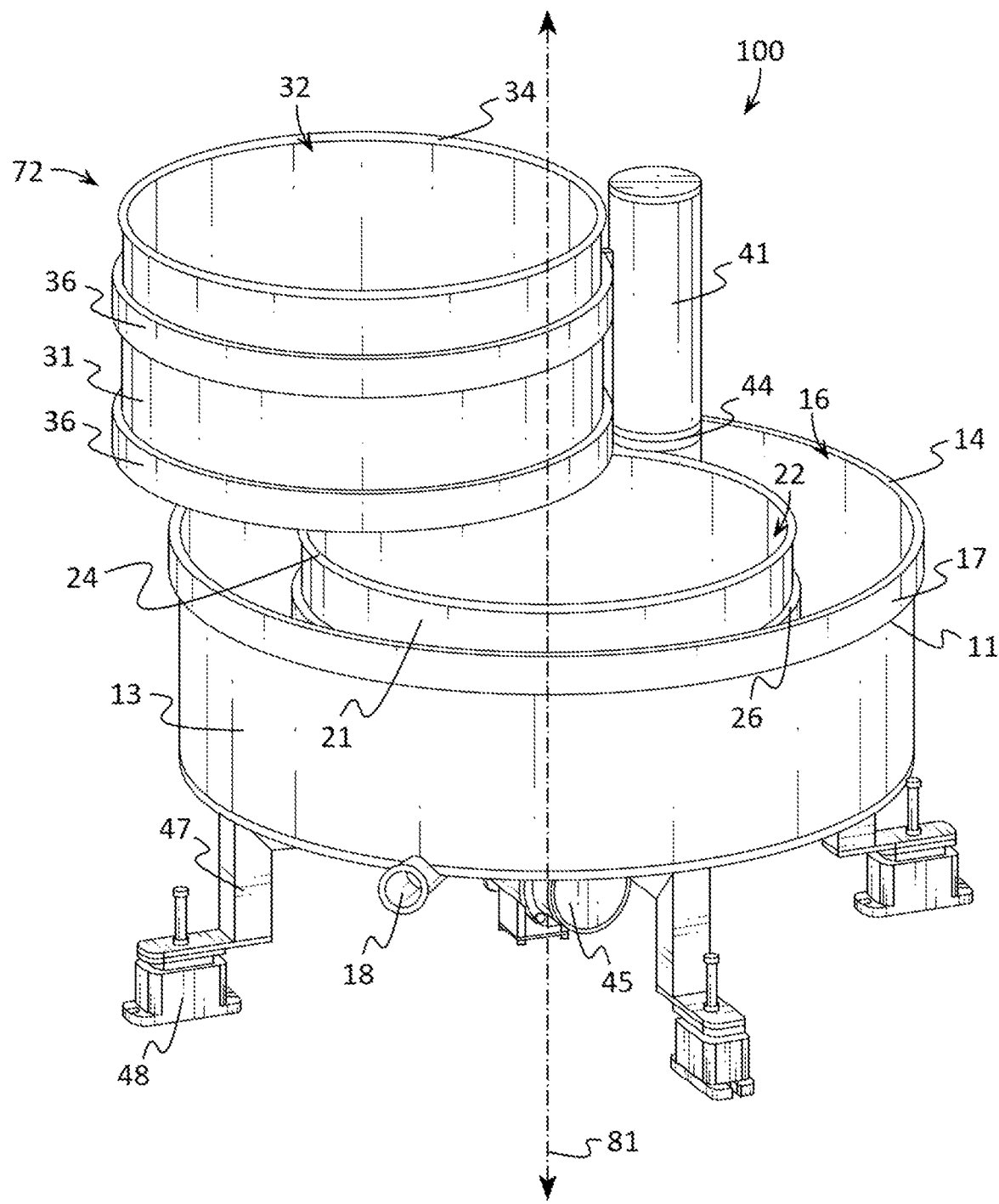
FIG. 2 illustrates a perspective view of an example of a separation tank device in a second position according to various embodiments described herein.
Figure 3:
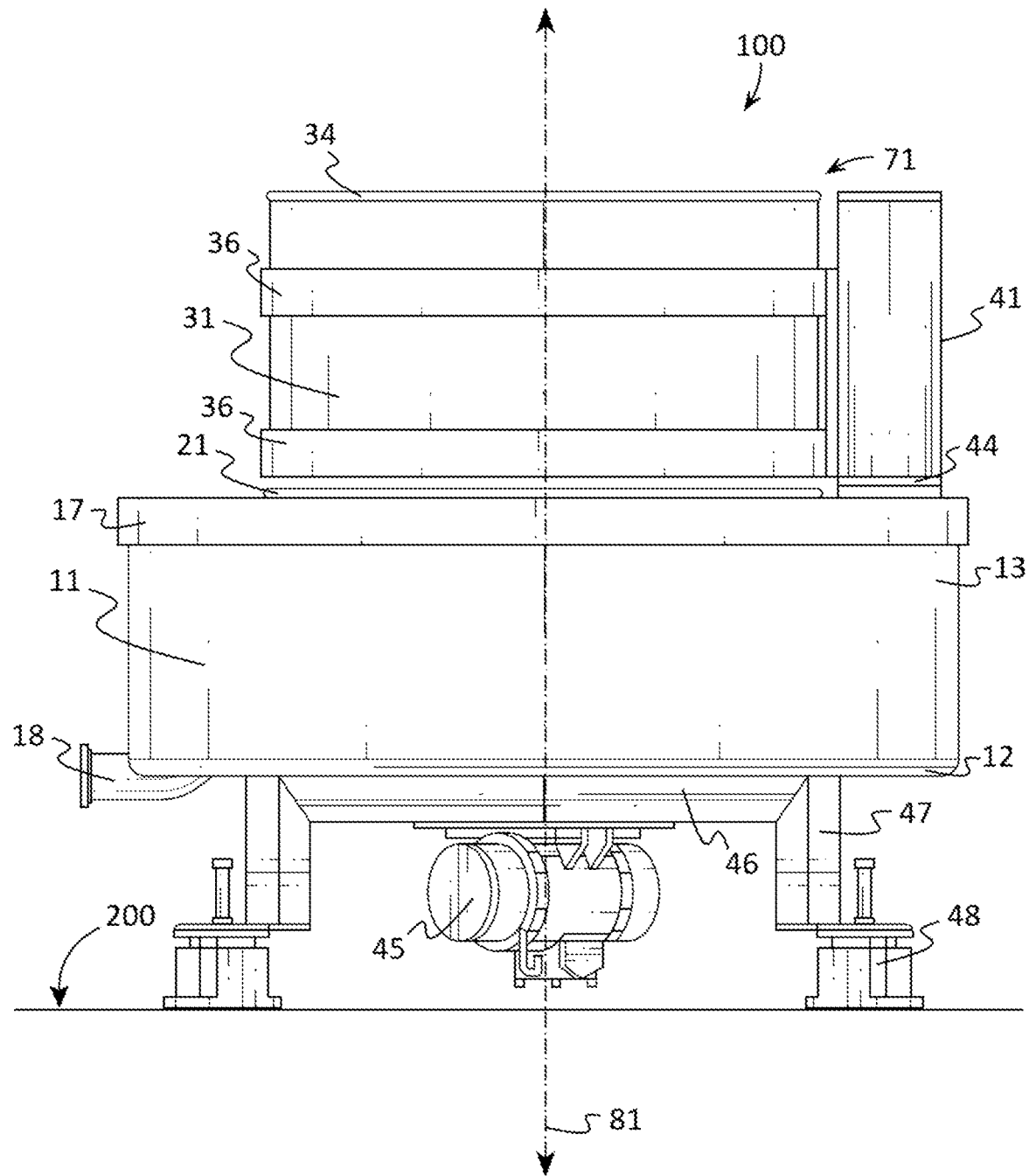
FIG. 3 shows a side elevation view of an example of a separation tank device according to various embodiments described herein.
Figure 4:
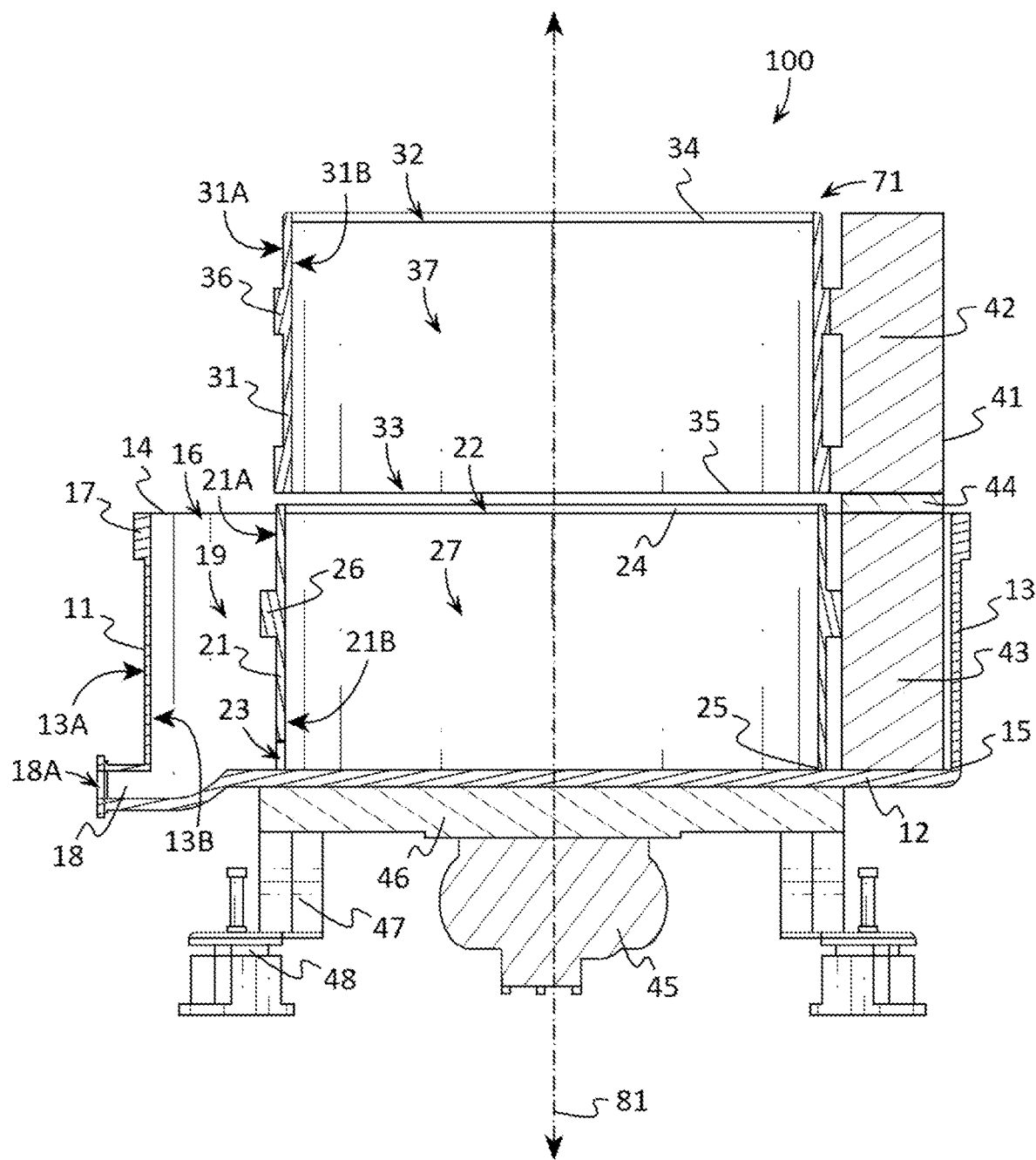
FIG. 4 depicts a sectional, through line 4-4 shown in FIG. 5, elevation view of an example of a separation tank device according to various embodiments described herein.
Figure 5:
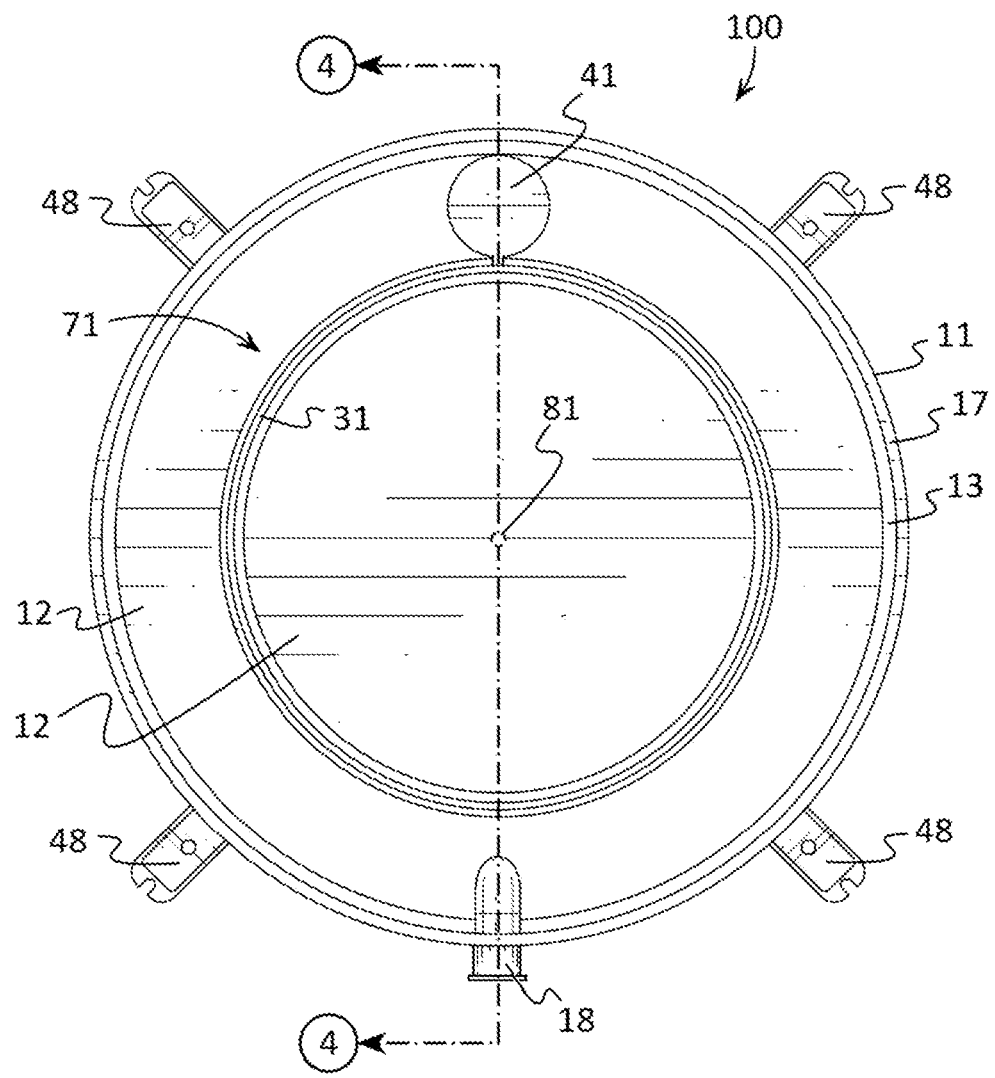
FIG. 5 illustrates a top plan view of an example of a separation tank device according to various embodiments described herein.
Figure 6:
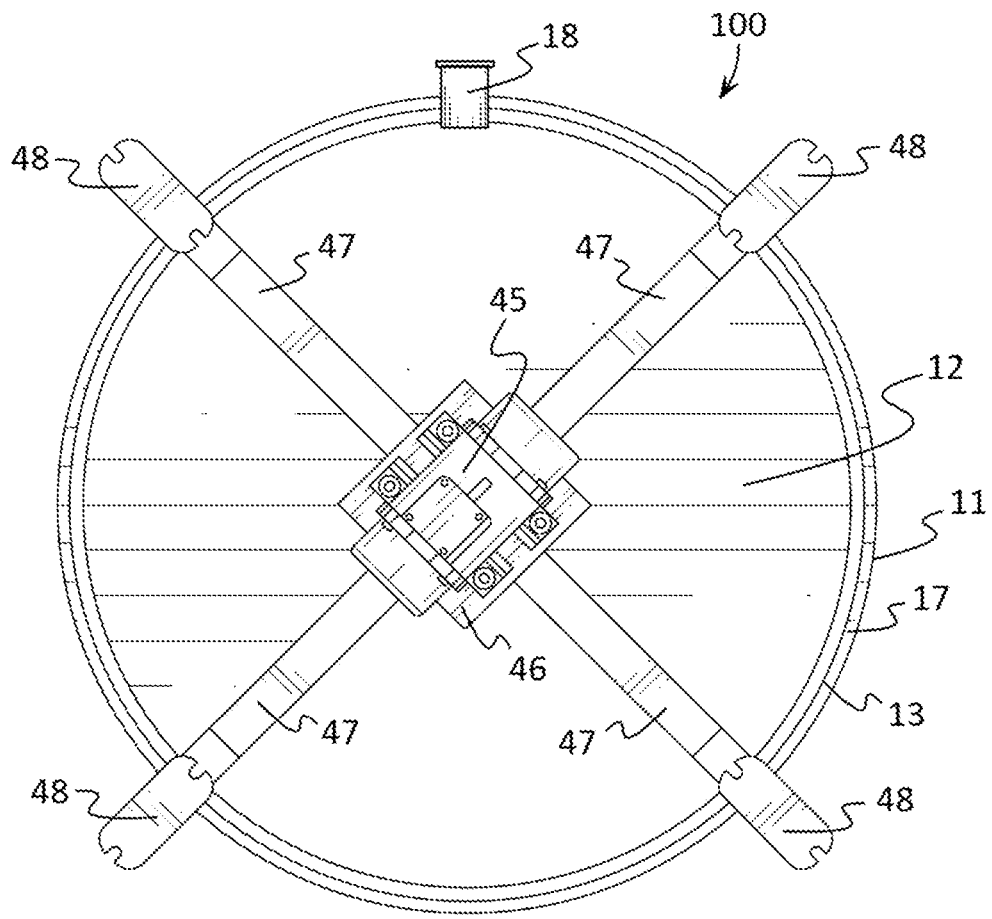
FIG. 6 shows a bottom plan view of an example of a separation tank device according to various embodiments described herein.

As perhaps best shown in FIGS. 1-5, the device 100 may comprise one or more movable walls 31 which may be moved between a first position 71 (FIGS. 1, 3-5) and a second position 72 (FIG. 2). In some embodiments, a movable wall 31 may comprise a movable lower aperture 33 and a movable upper aperture 32, and a base wall 21 may comprise a base lower aperture 23 and a base upper aperture 33. The movable lower aperture 33 and preferably the movable upper aperture 32 may be positioned above and aligned with the base upper aperture 32 and preferably with the base lower aperture 33 when the movable wall 31 is in the first position 71, and the movable lower aperture 33 and preferably the movable upper aperture 32 may be unaligned with the base upper aperture 32 and preferably with the base lower aperture 33 when the movable wall 31 is in the second position 72. As described above, the device 100 may comprise a central vertical axis 81, and one or more apertures 22, 23, 32, 33, may be aligned by having the central vertical axis 81 extend centrally through (substantially through the center) the apertures 22, 23, 32, 33, as perhaps best shown in FIGS. 4 and 5. Optionally, the tank upper aperture 16 may also be aligned with one or more of the apertures 22, 23, 32, 33, when the device 100 is in the first position 71. For example, if the apertures 22, 23, 32, 33, and tank aperture 16 each comprise a circular shape, the apertures 22, 23, 32, 33, and tank aperture 16 may be aligned by having their respective circular center points aligned in or with the central vertical axis 81. As another example, if the apertures 22, 23, 32, 33, and tank aperture 16 each comprise a square shape, the apertures 22, 23, 32, 33, and tank aperture 16 may be aligned by having their respective square center points aligned in or with the central vertical axis 81.

In preferred embodiments, a movable wall 31 may be moved into a second position 72 in which the center of a movable upper aperture 32 and/or movable lower aperture 33 may not be aligned with the central vertical axis 81. In this manner the center of a movable upper aperture 32 and/or movable lower aperture 33 may not be aligned with the center of a base upper aperture 22, base lower aperture 23, and/or tank aperture 16.

In further embodiments, a movable wall 31 may be moved into a second position 72 so that all or portions of the movable wall 31 are not positioned above a base wall 21 and/or tank wall 13. For example, a movable wall 31 may be moved into a second position 72 so that approximately thirty percent of the movable wall 31 is positioned above approximately thirty percent of the base wall 21 and/or tank wall 13 as shown in FIG. 2. As another example, a movable wall 31 may be moved into a second position 72 so that no portion of the movable wall 31 is positioned above the base wall 21 and/or tank wall 13. Optionally, a movable coupling 44 may allow a movable wall 31 to completely or partially revolve around an axis that may be formed by a support pillar 41.

In preferred embodiments, a movable wall 31 may be moved into a second position 72 so that all or portions of the movable wall 31 are not positioned above a base wall 21 and/or tank wall 13 while the movable wall 31 is coupled to a support pillar 41 that is also coupled to the holding tank 11 and/or base wall 21.

In some embodiments, the device 100 may comprise one or more filter bags 60, such as a first filter bag 60A, second filter bag 60B, third filter bag 60C, fourth filter bag 60D, fifth filter bag 60E, sixth filter bag 60F, seventh filter bag 60G, eighth filter bag 60H, etc. A filter bag 60 may be configured in any shape and size. In preferred embodiments, a filter bag 60 may comprise a generally cylindrical shape that has one open end (bag upper aperture 63) and one closed end (bag base 62). For example, a filter bag 60 may comprise a cylindrical bag wall 61 with a circular bag base 62 coupled to the cylindrical bag wall 61 and a bag upper aperture 63 formed by a bag upper perimeter 68 that may be portions of the cylindrical bag wall 61 that are distal to the circular bag base 62 with a bag cavity 67 formed between the bag wall 61, bag base 62, and bag aperture 63. Optionally, a filter bag 60 may comprise seam tape 66 or other seam bolstering material which may strengthen the coupling between portions of the filter bag 60 which may be sew or otherwise coupled together. In other embodiments, a filter bag 60 may be configured with an open rectangular prism shape, open triangular prism shape, etc.

A filter bag 60 may be made from or may comprise any material. In preferred embodiments, a filter bag 60 may be made from or may comprise a food safe or food grade nylon mesh material, propylene mesh material, or any other suitable mesh material. In further embodiments, a filter bag 60 may be made from or may comprise a substantially rigid material, such as stainless steel, nylon, propylene, etc., having a plurality of small filtering apertures or holes.

In some embodiments, a filter bag 60 may comprise a tensioner 64 and/or retainer 65 which may be used to control the size and shape of the bag upper aperture 63. In preferred embodiments, a tensioner 64 may comprise a drawstring and a retainer 65 may comprise a cord lock which may be movably positioned on the drawstring type tensioner 64. In other embodiments, a tensioner 64 and/or retainer 65 may comprise a hook and loop fastener, such as Velcro, a bungee cord or other elastic element, or any other device or fastener which may be used to control the size and shape of the bag upper aperture 63. In some embodiments, a tensioner 64 and/or retainer 65 may be used to removably couple a filter bag 60 to a base wall 21, movable wall 31, and/or to one or more other filter bags 60. For example, by placing a lower portion of a bag wall 61 in a movable cavity 37 of a movable wall 31 and an upper portion of the bag wall 61 over and around a movable upper perimeter 34 and by tensioning a drawstring type tensioner 64, the drawstring type tensioner 64 may frictionally engage and secure the filter bag 60 to the movable wall 31. In other embodiments, a filter bag 60 may be coupled to a base wall 21, movable wall 31, and/or to one or more other filter bags 60 with any other coupling method.

Generally, a filter bag 60 may be configured to strain material that may be poured or otherwise deposited into the bag cavity 67 via the bag upper aperture 63. In some embodiments, one or more filter bags 60 may be positioned in a base cavity 27 and/or a movable cavity 37 so that material that is poured or otherwise deposited into a base upper aperture 22 and/or a movable upper aperture 32 may be likewise poured or otherwise deposited into the bag cavity 67 of each filter bag 60.

In preferred embodiments, a filter bag 60 may be received in a movable wall 31 by having the bag wall 61 placed in contact with or in close proximity to the movable interior surface 31B, by having the bag upper aperture 63 placed around or within the movable upper perimeter 34, and by having the bag base 62 placed in or proximate to the movable lower aperture 33. In this manner, the filter bag 60 may be positioned so that in order for material to pass through the movable cavity 37 and to exit the movable lower aperture 33, the material must first pass through the filter bag 60 and its bag cavity 67. Similarly, and in preferred embodiments, a filter bag 60 may be received in a base wall 21 by having the bag wall 61 placed in contact with or in close proximity to the base interior surface 21B, by having the bag upper aperture 63 placed around or within the base upper perimeter 24, and by having the bag base 62 placed in or proximate to the base lower aperture 23. In this manner, the filter bag 60 may be positioned so that in order for material to pass through the base cavity 27 and to exit the base lower aperture 23, the material must first pass through the filter bag 60 and its bag cavity 67.

Figure 7:
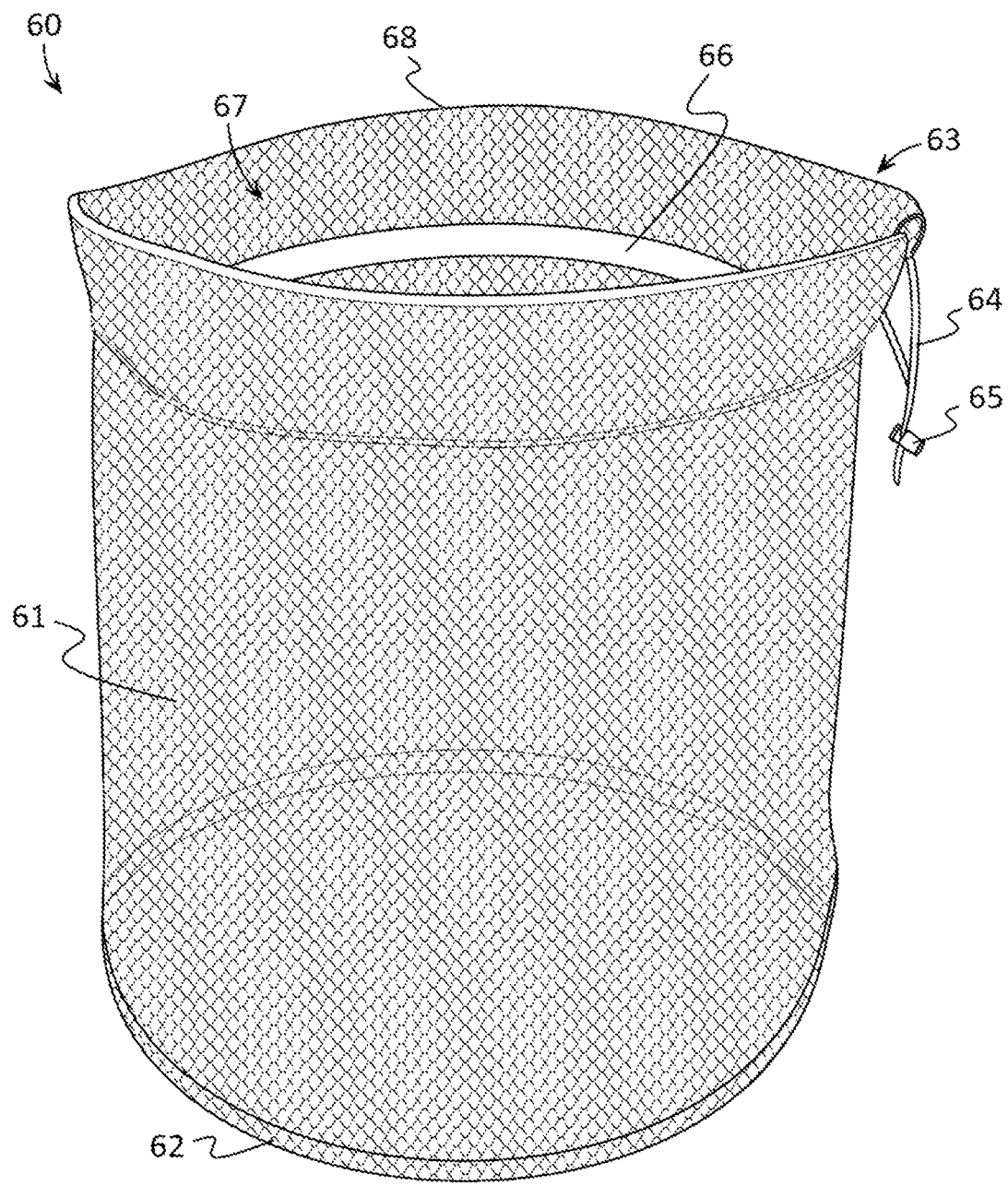
FIG. 7 depicts a perspective view of an example of a filter bag according to various embodiments described herein.
Figure 8:
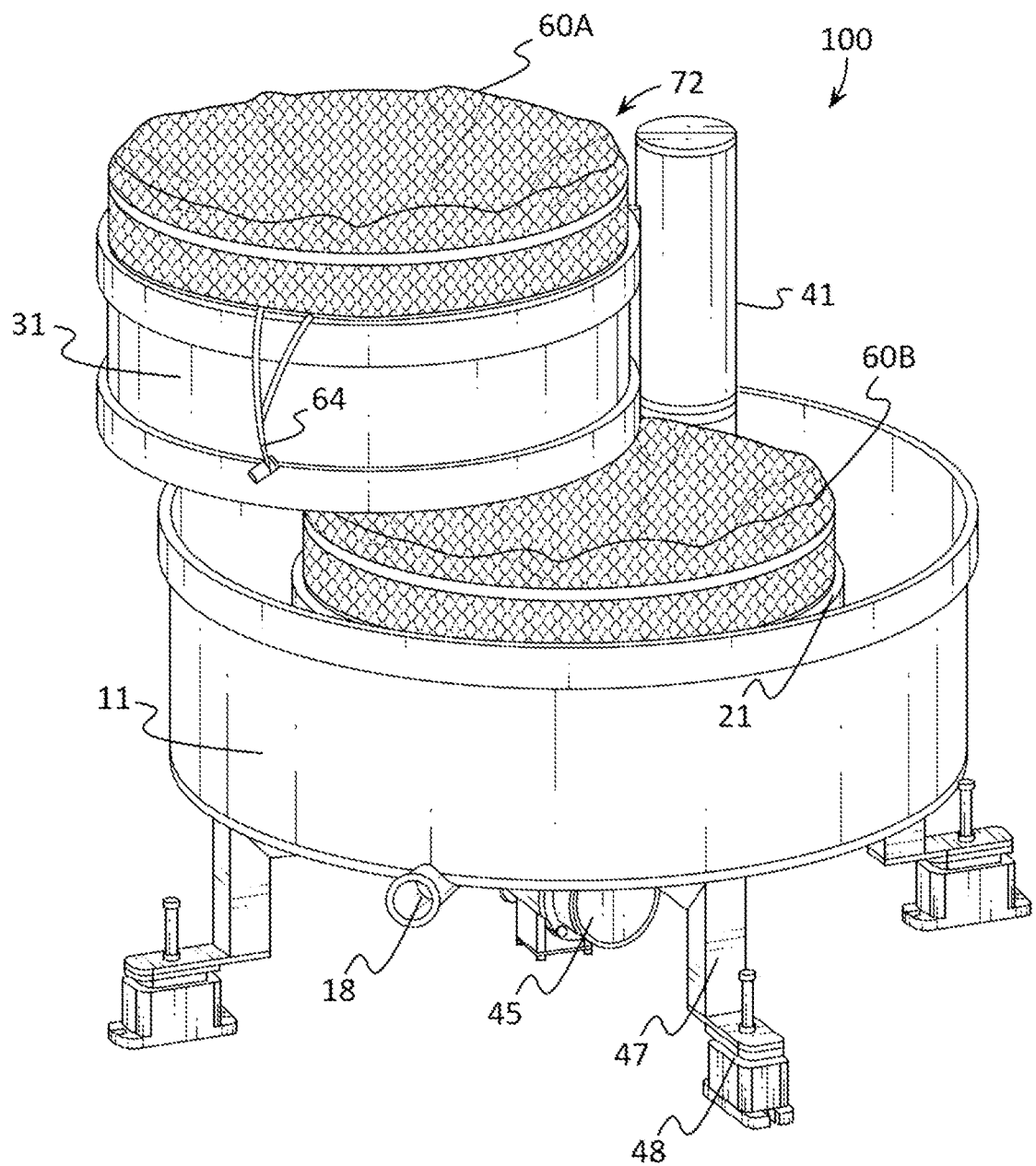
FIG. 8 illustrates a perspective view of a further example of a separation tank device having a first and second filter bag according to various embodiments described herein.
Figure 9:
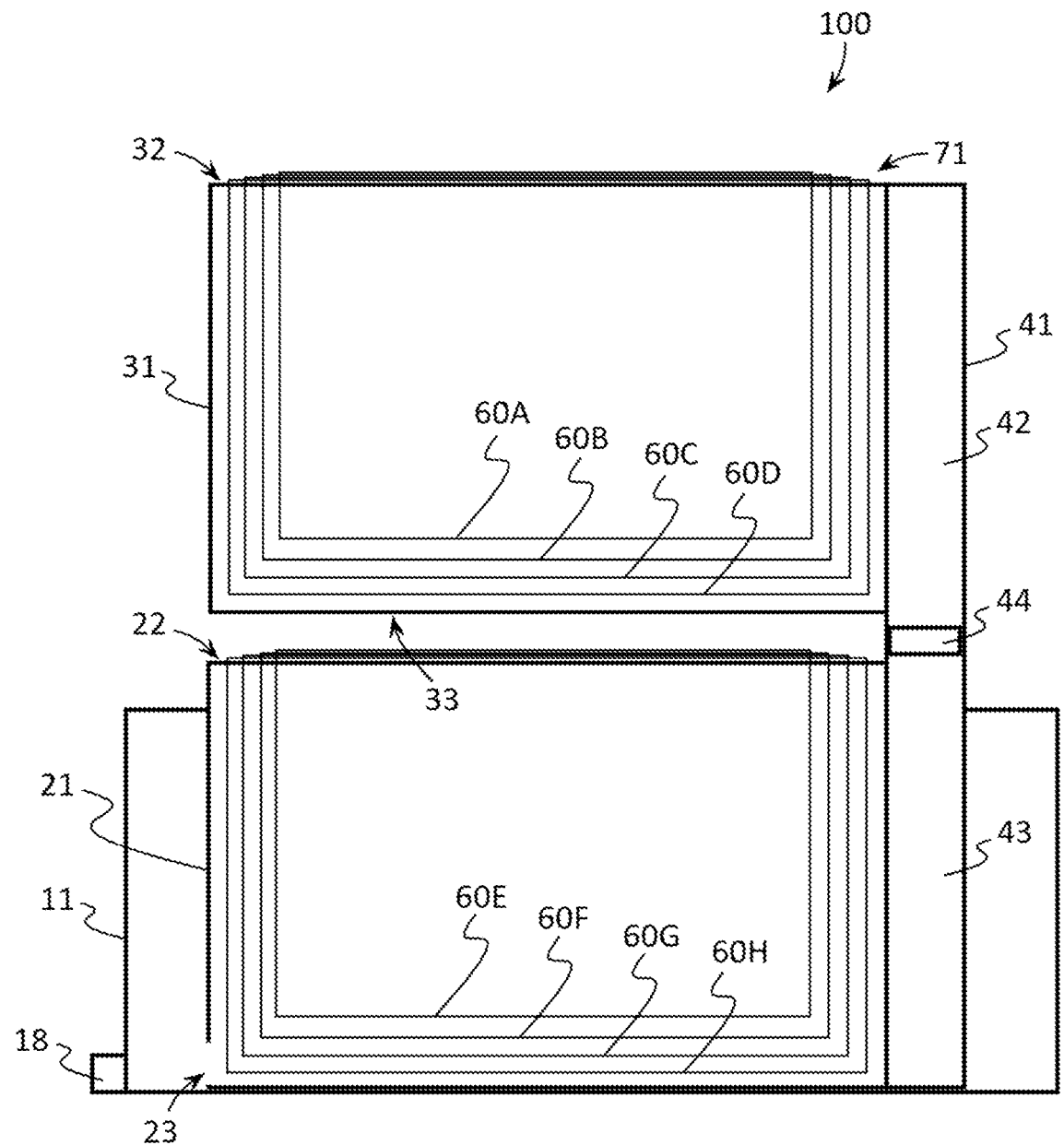
FIG. 9 shows a schematic diagram of another example of a separation tank device having nested filter bags according to various embodiments described herein.

In some embodiments, all or portions of a filter bag 60, such as all or portions of the bag wall 61 and bag base 62 may comprise a mesh filtering material that may have a plurality of small holes or apertures which may be used to filter desired particle sizes. In some embodiments, all or portions of the bag wall 61 and bag base 62 may comprise a mesh filtering material or any other material, including substantially rigid materials, that may be suitable for filtering particles sizes between approximately 500 microns and 10 microns in diameter. In preferred embodiments, all or portions of the bag wall 61 and bag base 62 may comprise a mesh filtering material or any other material, including substantially rigid materials, that may be suitable for filtering particles sizes between approximately 250 microns and 20 microns in diameter, and more preferably between approximately 220 microns and 40 microns in diameter. It should be understood that the small holes or apertures of the example filter bags 60, 60A, 60B, shown in FIGS. 7 and 8 are shown only for illustration purposes and that filter bags 60, 60A, 60B, may be configured with larger or, more preferably, smaller sized small holes or apertures depending on the type of materials to be separated using the device 100.

In preferred embodiments, the device 100 may one or more filter bags 60, including: a first filter bag 60A having a mesh filtering material that may be suitable for filtering particles sizes of approximately 220 microns; a second filter bag 60B having a mesh filtering material that may be suitable for filtering particles sizes of approximately 180 microns; a third filter bag having a mesh filtering material that may be suitable for filtering particles sizes of approximately 150 microns; a fourth filter bag having a mesh filtering material that may be suitable for filtering particles sizes of approximately 120 microns; a fifth filter bag having a mesh filtering material that may be suitable for filtering particles sizes of approximately 104 microns; a sixth filter bag having a mesh filtering material that may be suitable for filtering particles sizes of approximately 90 microns; a seventh filter bag having a mesh filtering material that may be suitable for filtering particles sizes of approximately 70 microns; and an eighth filter bag having a mesh filtering material that may be suitable for filtering particles sizes of approximately 40 microns.

In preferred embodiments, at least one filter bag 60 may be received in a movable wall 31 and at least one filter bag 60 may be received in a base wall 60. In further preferred embodiments, two or more filter bags 60 that may be received within a movable wall 31 may be nested or stacked with each other so that portions of at least one filter bag 61 may be positioned within the bag cavity 67 of another filter bag 60. In this manner, by pouring or otherwise depositing material into the bag upper aperture 63 of the upper nested filter bag 60, the material must also pass through each subsequent or lower nested filter bag 60 and ultimately through the movable lower aperture 33. In further preferred embodiments, two or more filter bags 60 that may be received within a base wall 21 may be nested or stacked with each other so that portions of at least one filter bag 61 may be positioned within the bag cavity 67 of another filter bag 60. In this manner, by pouring or otherwise depositing material into the bag upper aperture 63 of the upper nested filter bag 60, the material must also pass through each subsequent or lower nested filter bag 60 and ultimately through the base lower aperture 23.

In further preferred embodiments, a first filter bag 60A having a mesh filtering material that may be suitable for filtering particles sizes of approximately 220 microns; a second filter bag 60B having a mesh filtering material that may be suitable for filtering particles sizes of approximately 180 microns; a third filter bag 60C having a mesh filtering material that may be suitable for filtering particles sizes of approximately 150 microns; and a fourth filter bag 60D having a mesh filtering material that may be suitable for filtering particles sizes of approximately 120 microns may be nested together and received within a movable wall 31 so that material must first pass through the first filter bag 60A, to the second filter bag 60B, to the third filter bag 60C, to the fourth filter bag 60D, before finally exiting the movable lower aperture 33. The movable wall 31 may also be in the first position 71 so that material exiting the movable lower aperture 33 may then be directed into the base upper aperture 22. A fifth filter bag 60E having a mesh filtering material that may be suitable for filtering particles sizes of approximately 104 microns; a sixth filter bag 60F having a mesh filtering material that may be suitable for filtering particles sizes of approximately 90 microns; a seventh filter bag 60G having a mesh filtering material that may be suitable for filtering particles sizes of approximately 70 microns; and an eighth filter bag 60H having a mesh filtering material that may be suitable for filtering particles sizes of approximately 40 microns may be nested together and received within a base wall 31 so that material must first pass through the fifth filter bag 60E, to the sixth filter bag 60F, to the seventh filter bag 60G, to the eighth filter bag 60H, before finally exiting the base lower aperture 23 to enter the holding tank 11. Material in the holding tank 11 may then exit the device 100 via the tank drain 18 with the movement of the material through the device 100 facilitated or enabled (depending on the material) by vibrations generated by a vibration motor 45.

While some exemplary shapes and sizes have been provided for elements of the device 100, it should be understood to one of ordinary skill in the art that a holding tank 11, base wall 21, movable wall 31, support pillar 41, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A separation tank device, the device comprising:
    a holding tank having a tank wall coupled to and extending above a tank base and forming a tank cavity;
    a base wall located within and completely surrounded by the tank cavity and the base wall coupled to a single support pillar and the base wall positioned above the tank base, the base wall forming a base upper aperture that is opposingly positioned to the tank base;
    a base lower aperture formed in the base wall and positioned above the tank base;
    a movable wall coupled to the single support pillar and positioned above the base wall, the movable wall not directly contacting the base wall so that the moveable wall is movable between a first position and a second position relative to the base wall and the tank wall, the movable wall comprising a movable upper aperture and a movable lower aperture, wherein the movable lower aperture is positioned above and aligned with the base upper aperture when the movable wall is in the first position, and wherein the movable lower aperture is unaligned with the base upper aperture when the movable wall is in the second position.

2. The device of claim 1, further comprising a movable coupling that is coupled to the single support pillar, wherein the movable coupling enables the movable wall to pivot between the first position and the second position.

3. The device of claim 2, wherein the single support pillar comprises an upper section and a lower section, wherein the lower section is coupled to the holding tank and the base wall, wherein the upper section is movably coupled to the lower section via the movable coupling.

4. The device of claim 1, further comprising a vibration motor configured to vibrate the base wall and the movable wall.

5. The device of claim 4, wherein the vibration motor is positioned centrally below the base upper aperture.

6. The device of claim 1, further comprising an isolation mount that is configured to reduce vibration transmission between the device and a surface that is supporting the device.

7. The device of claim 1, further comprising a tank drain.

8. The device of claim 1, further comprising a first filter bag and a second filter bag.

9. The device of claim 1, wherein material entering the movable cavity must pass through a first filter bag before exiting the movable lower aperture, and wherein material entering the base upper aperture must pass through a second filter bag before exiting the base lower aperture.

10. The device of claim 9, wherein the first filter bag and the second filter bag are each configured to filter particle sizes between 250 microns and 20 microns.

11. A separation tank device, the device comprising:
a holding tank having a tank wall coupled to and extending above a tank base and forming a tank cavity;
a base wall located within and surrounded by the tank cavity and coupled to a single support pillar and positioned above the tank base, the base wall forming a base upper aperture that is opposingly positioned to the tank base;
a base lower aperture formed in the base wall; and
a movable wall pivotally coupled to the single support pillar and not directly contacting the base wall so that the movable wall pivots relative to the base wall between a first position and a second position, the movable wall comprising a movable upper aperture and a movable lower aperture, wherein the movable lower aperture is positioned above and aligned with the base upper aperture when the movable wall is in the first position, and wherein the movable lower aperture is unaligned with the base upper aperture when the movable wall is in the second position;
a first filter bag, wherein material entering the movable cavity must pass through the first filter bag before exiting the movable lower aperture; and
a second filter bag, wherein material entering the base cavity must pass through the second filter bag before exiting the base lower aperture.

12. The device of claim 11, further comprising a movable coupling that is coupled to the single support pillar, wherein the movable coupling enables the movable wall movable between the first position and the second position.

13. The device of claim 12, wherein the single support pillar comprises an upper section and a lower section, wherein the lower section is coupled to at least one of the holding tank and the base wall, wherein the upper section is movably coupled to the lower section via the movable coupling.

14. The device of claim 11, wherein the vibration motor is positioned centrally below the base upper aperture.

15. The device of claim 11, further comprising an isolation mount that is configured to reduce vibration transmission between the device and a surface that is supporting the device.

16. The device of claim 11, wherein the first filter bag and second filter bag are each configured to filter particle sizes between 250 microns and 20 microns.

17. The device of claim 11, further comprising a vibration motor configured to vibrate the base wall and the movable wall.

18. The device of claim 11, further comprising a tank drain.

* * * * *